United States Patent [19]

Okuyama et al.

[11] 3,948,664

[45] Apr. 6, 1976

[54] POLYETHYLENE TEREPHTHALATE FILM FOR USE AS SUPPORT FOR RADIOGRAPHIC FILM

[75] Inventors: Hiroshi Okuyama; Teruo Kobayashi; Noburo Hibino, all of Minami-ashigara, Japan

[73] Assignee: Fuji Photo Film Co., Ltd., Minami-ashigara, Japan

[22] Filed: Oct. 15, 1973

[21] Appl. No.: 406,525

Related U.S. Application Data

[63] Continuation-in-part of Ser. No. 252,061, May 10, 1972, abandoned, which is a continuation-in-part of Ser. No. 851,853, Aug. 21, 1969, abandoned.

[30] Foreign Application Priority Data

Aug. 21, 1968 Japan................................ 43-59473

[52] U.S. Cl.......................... 96/84 R; 96/87 R; 8/4; 8/39 R; 260/40 R

[51] Int. Cl.............................................. G03c 1/84
[58] Field of Search............. 96/87 R, 84 R; 8/39, 4; 260/40 R

[56] References Cited

UNITED STATES PATENTS 3,488,195   1/1970   Hunter................................... 96/84

*Primary Examiner*—Ronald H. Smith
*Attorney, Agent, or Firm*—Sughrue, Rothwell, Mion, Zinn & Macpeak

[57] ABSTRACT

A colored polyetylene terephthalate film to be employed as the support in radiographic films, having incorporated therein certain specific anthraquinone dyes.

12 Claims, 4 Drawing Figures

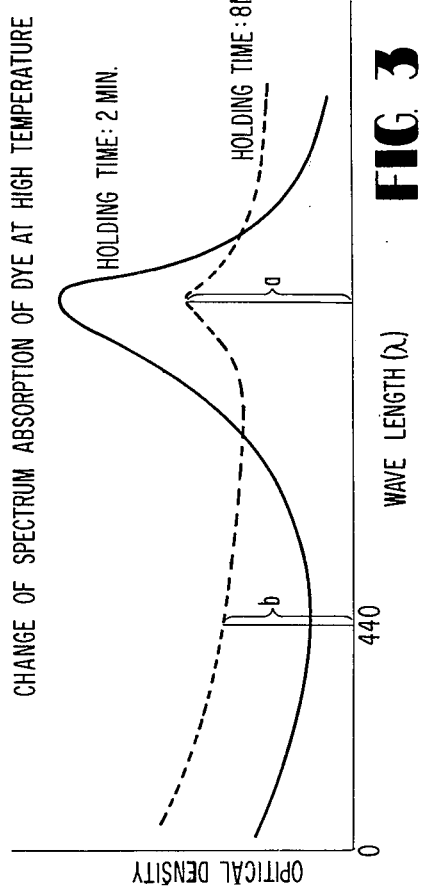
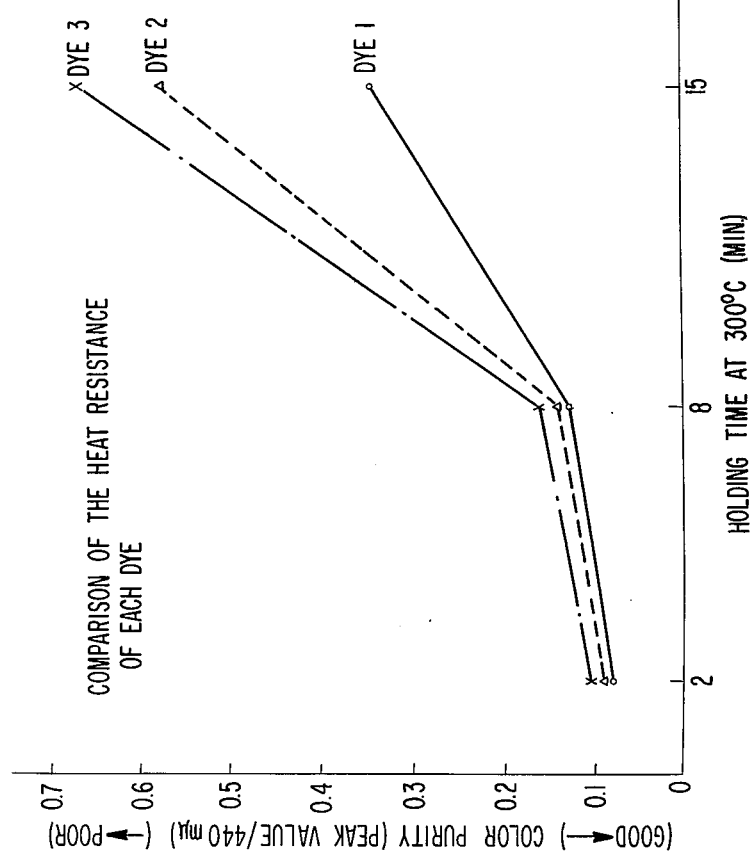

POLYETHYLENE TEREPHTHALATE FILM FOR USE AS SUPPORT FOR RADIOGRAPHIC FILM

CROSS-REFERENCE TO RELATED APPLICATIONS

This application is a continuation-in-part application of U.S. patent application Ser. No. 252,061, filed May 10, 1972, now abandoned, in turn a continuation-in-part application of U.S. patent application Ser. No. 851,853, filed Aug. 21, 1969, claiming priority from Aug. 21, 1968 based upon Japanese application Ser. No. 59673/68, now abandoned.

BACKGROUND OF THE INVENTION

1. Field of the Invention

This invention relates to a polyethylene terephthalate film for use as a support of photographic film and, more particularly, to a polyethylene terephthalate film for use as a support of radiographic film.

2. Description of the Prior Art

It is desirable for radiographic films to be colored blue or bluish purple to facilitate the viewing of a photographic image thereon. It is also desirable for radiographic film supports to have a minimal absorption in the short wavelength region, because the radiograph film is sensitive to radiations of short wavelength. Therefore, to the degree that the support absorbs such radiations desensitization results by the filtering action of the support on the photo-sensitive emulsion layer. That is, ordinary radiographic film consists of a support bearing a photo-sensitive emulsion on the both surfaces thereof and image cntrast is reduced by a support possessing a yellow tint.

It is, accordingly, desirable to color the support material, e.g., a polyethylene terephthalate, of such films a blue or bluish-purple color to avoid the presence of such a yellow tint.

The coloring matter to use for coloring a polyethylene terephthalate film, for use as the support layer of a radiographic film, blue or bluish-purple should be such that it has good thermal resistance, good compatibility with polyethylene terephthalate and proper chromaticity. Also, it should be inert to the silver halide emulsion; that is, it should have no adverse effect on photographic characteristics, such as sensitivity, gamma and fog.

Since the manufacture of polyethylene terephthalate film on a commercial scale is by a hot melt extrusion process, coloring material to be incorporated therein is required to have high thermal resistance, withstanding temperatures of from 270° to 300°C. It is difficult to manufacture a colored or pigmented polyethylene terephthalate film by dyeing or like coloring treatment of an unpigmented film due to its very stable physical structure. Therefore, a mass coloring process is preferred, in which a coloring material is dissolved or dispersed in the polyethylene terephthalate during the synthesis or hot melt processing thereof. Accordingly, the coloring material is required to have high thermal resistance, withstanding processing temperatures of 270° to 300°C without any decomposition and discoloration. Use of a mass coloring process has the advantage that pigmentation is attained concurrently with the molding process and does not require any other step.

In such mass coloring, it is required that the coloring material be easily and uniformly dispersed or dissolved in the polyethylene terephthalate. In particular, when pigmented polyethylene terephthalate is used for the manufacture of films to be used as supports for photographic film, a haze in such supports due to insufficient dispersion of the coloring material and/or the presence of granular foreign material must be completely avoided in order to satisfy the demand for high clarity and optical purity in such materials. As is well known to those skilled in the art, it is necessary that polyethylene terephthalate films manufactured in a melt extrusion process be stretched and heat treated under appropriate conditions in order to gain useful properties. Such stretching very often causes, even if the coloring material is uniformly dispersed in an amorphous unoriented film to such a degree as not to impair the clarity of the film, the formation of cleavages between the undeformable particles of the coloring material and the plastically deformable polyethylene terephthalate matrix. Such cleavages causes a scattering of light, thus, increasing the haze level of the film. Therefore, especially in the manufacture of photographic films, it is necessary to disperse the coloring material into very fine particles, or to dissolve it into a state of molecular dispersion, so as to prevent formation of such cleavages during stretching.

Referring now to the coloring or pigmentation appropriate to radiographic films, methods of indication and determination of color are provided in the Japanese Industrial Standard (JIS) Z8701-1958 and in (JIS) Z8722-1959, respectively.

With regard to the specific prior art, there may be mentioned Swiss Pat. No. 405,227, U.S. Pat. No. 3,215,710 and U.S. Pat. No. 3,488,195.

The Swiss Patent noted above relates to a process for dyeing and printing polyester fibers, especially polyethylene, terephthalate fibers by employing dye-, tri-, and tetra-nitro derivative dyes obtained through the nitrification of diarylamino anthraquinones having the following formula:

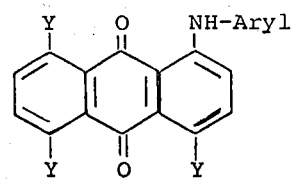

Wherein one of Y is —NH—Aryl and the other two Y's are hydrogen atoms.

With regard to U.S. Pat. No. 3,215,710, this patent discloses a process for preparing 1-hydroxy-4-phenylaminoanthraquinones which are useful for dyeing polyester fibers. These compounds may be structurally illustrated as follows:

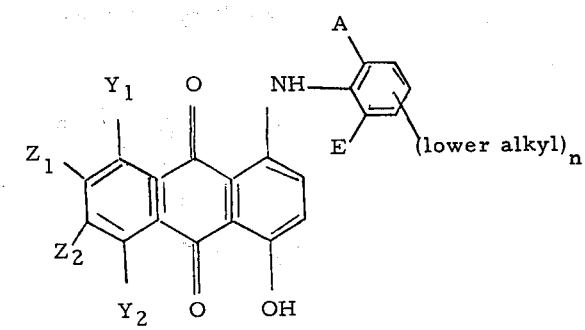

wherein $Y_1$ and $Y_2$ are hydrogen or hydroxy; $Z_1$ and $Z_2$ are hydrogen or chlorine; A is a lower alkyl group or a lower alkoxyl group; E is chlorine, a lower alkyl group, or a lower alkoxyl group; and n is integer ranging from 0 to 2, both members of one of the pairs of $Y_1$ and $Y_2$ and $Z_1$ and $Z_2$ being hydrogen atoms.

The phenyl group of the present invention has only one substituent thereon, while that of the above metnioned patent requires at least two substituents. This difference in the substituents on the phenyl group results in a difference in color with respect to the dyes encompassed within each of the generic formulas. The reason for this color difference, results from the fact that the dyes of the aforementioned patent maintain a short wavelength (below 593 m.μ.), while the dyes of the present invention exhibit a wavelength at around 625 m.μ. and upwards.

As a result of the above fact, both the dyes of U.S. Pat. No. 3,215,710 and Swiss Pat. No. 405,227 exhibit extremely poor heat resistance, which allows these dyes to dramatically change in color during the presence of heat. Consequently, these dyes are not suitable for purposes of the present invention.

The closest prior art known by applicants is U.S. Pat. No. 3,488,195 which discloses a light-sensitive photographic element capable of being employed for radiographic purposes, comprising a linear polyester support containing as a coloring material, at least one of the compound, 1,4-dimesidinoanthraquinone, 1,5-bis(para toluidine)-4,8-dihydroxyanthraquinone, 4-anilino-1,8-dihydroxy-5-nitro-anthraquinone, 5-anilino-4-amino-1,8-dihydroxyanthraquinone, 1,4-bis(2,6-diethylanilino) anthraquinone, 4-(4-beta-hydroxyethylanilino)-1,8-dihydroxy-5-nitroanthraquinone, 4-(4-beta-hydroxyethylanilino)-1,8-dihydroxy-5-aminoanthraquinone, and 1,5-di[p-(beta-hydroxyethoxyethoxyethoxy) phenol] amino-4,8-dihydroxyanthraquinone, and a photographic emulsion layer adhere to at least one surface of said support.

These dyes maybe structurally illustrated as follows:

I. 1,4-dimesidino-anthraquinone

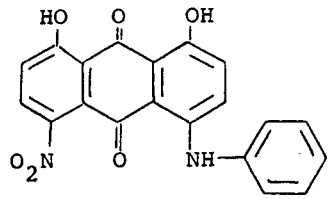

II. 1,5-bis(p-toluidine)-4,8-dihydroxy-anthraquinone

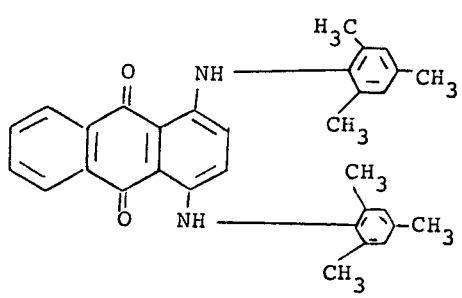

III. 4-anilino-1,8-dihydroxy-5-nitro-anthraquinone

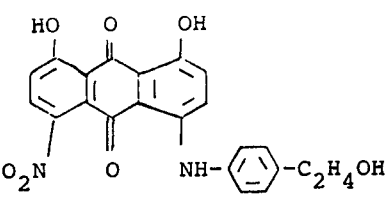

IV. 5-anilino-4-amino-1,8-dihydroxy-anthraquinone

V. 1,4-bis(2,6-diethylanilino)anthraquinone

VI. 4-(4-β-hydroxyethylanilino)-1,8-dihydroxy-5-nitro-anthraquinone

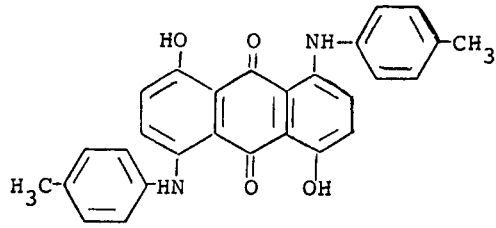

VII. 4-(4-β-hydroxyethylanilino)-1,8-dihydroxy-5-amino-anthraquinone

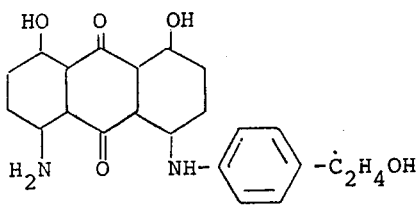

VIII. 1,5-di[p-(β-hydroxyethyoxyethyoxyethyoxy)-phenyl]-amino-4,8-dihydroxy-anthraquinone

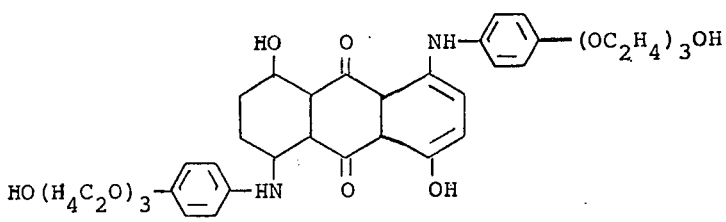

As will be seen later on, in the body of this specification, when the dyes of Hunter were compared with the dyes of the present invention for heat resistance, the dyes of the present invention substantially out performed those of Hunter.

DESCRIPTION OF THE DRAWINGS

In the accompanying drawings,
FIG. 3 shows the change of absorption of dye at high temperature and
FIG. 4 is a comparison of heat resistance for three dyes.

All colors may be indicated by the value $x$, $y$, and $Y$ as defined in the above Japanese Industrial Standards.

Figure 2:
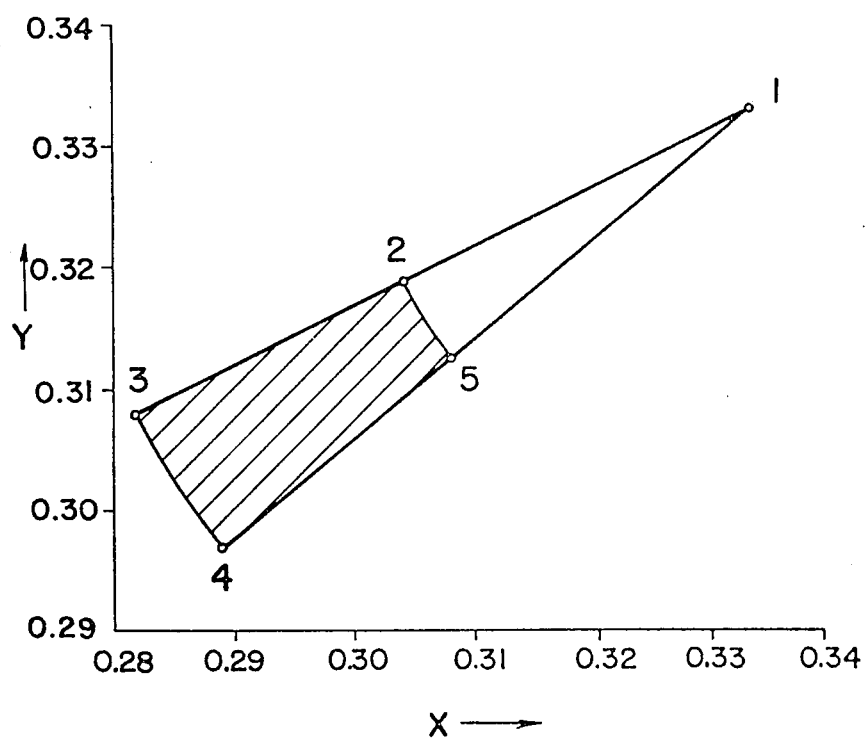

According to the present invention, the color most suitable for radiographic films is of a chromaticity in the oblique-lined region surrounded by the points 2, 3, 4 and 5 in FIG. 2, and of a $Yc$ of at least 65%. This region was derived from the results obtained by preparing radiographic films having incorporated therein various colors either alone or in admixture with each other, actually taking a photograph using such films, developing the films and comparing the distinctness of the resulting images. Since a radiograph is usually observed by transmitted light, the determination of the color of the support of radiographic films in accordance with the present invention was made under conditions in accordance with the determination of color of ordinary transmitting bodies. As a luminescent source was used a standard light C. The measuring device employed was a photoelectric chromatometer made by Tokyo Shibaura Electric Co., Ltd.

Figure 1:
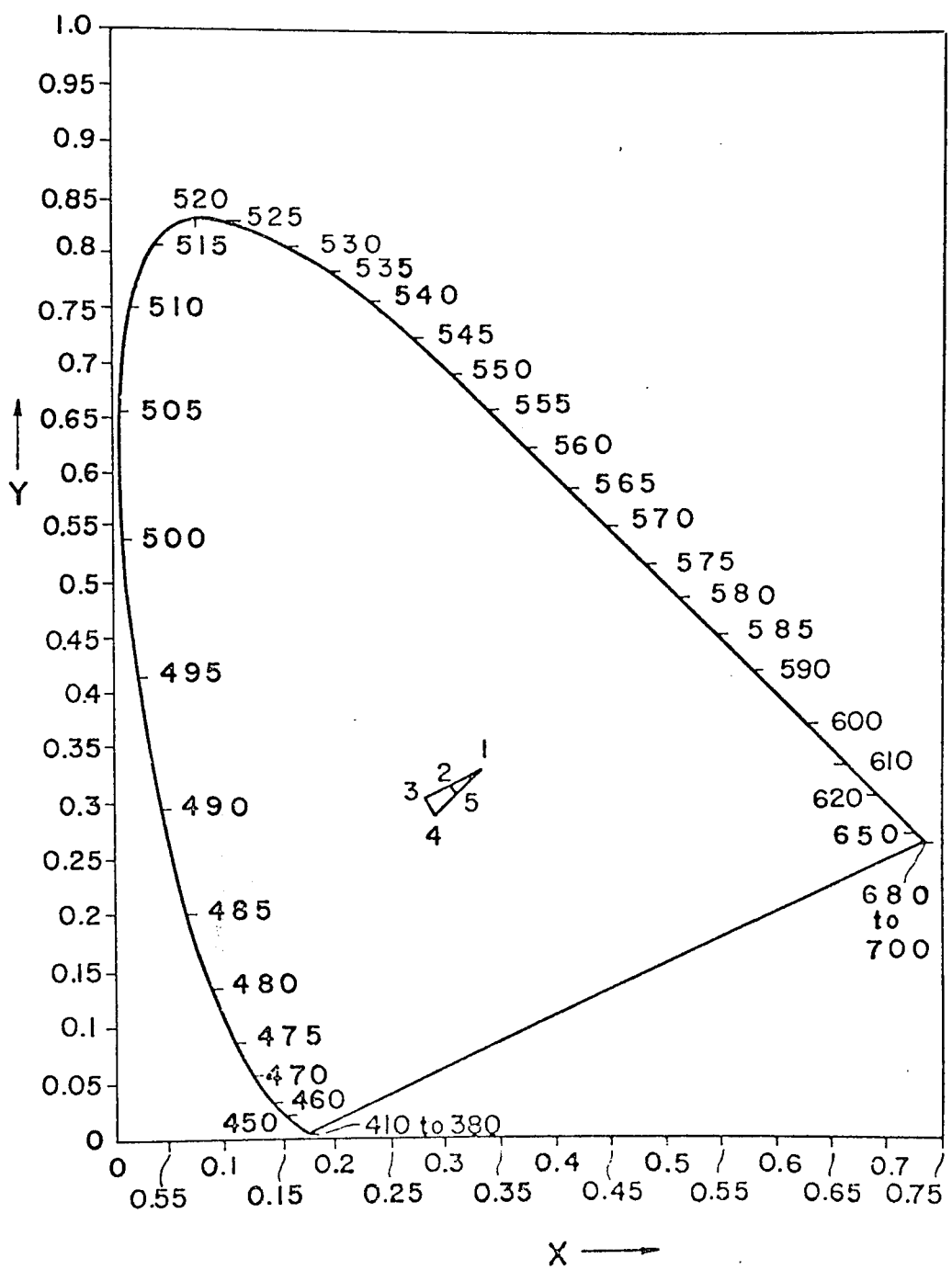
FIG. 1 shows a chromaticity diagram in accordance with JIS Z8701-1958 and
FIG. 2 is an enlarged view of a portion of FIG. 1.

In FIG. 1 the numeral 1 indicates the chromaticity coordinate of neutral point (X = 0.333; y = 0.333). Points 2 and 5 are on the circumference at a circle centering on point 1, and points 3 and 4 are on the circumference at another circle centering on point 1. Locating these points in terms of $(x,y)$, point 2 is (0.304, 0.319), point 3 is (0.282, 0.308), point 4 is (0.289, 0.297), and point 5 is (0.308, 0.313).

SUMMARY OF THE INVENTION

The object of the present invention is to provide a coloring material for polyethylene terephthalate films used in radiographic films which will satisfy all the very severe requirements for sensitometry, thermal resistance, compatibility and color as mentioned above.

As a result of our investigations of various coloring materials, having various structures, we have found that as coloring materials satisfying the above variety of requirements, there may be very suitably used the compound 1,5-di-(ortho-methylphenylamino)-4,8-dihydroxy anthraquinone represented by the following formula:

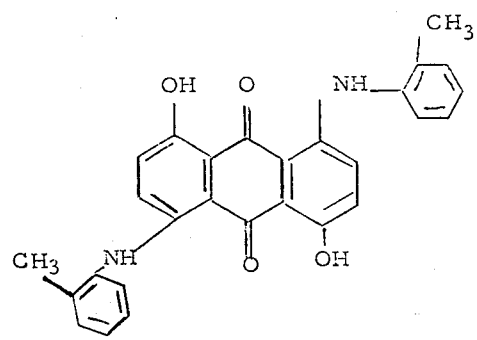

DETAILED DESCRIPTION OF THE INVENTION

The coloring material employed in the present invention is as follows: 1,5-di-(ortho-methylphenylamino)-4,8-dihydroxy anthraquinone.

This dye can be obtained by a known method, for example, in which 1,5-substituted di-hydroxy-leucoanthraquinone is condensed with the corresponding aromatic amine. We have found that the dye represented by the foregoing structural formula is capable of satisfying the requirements for photographic characteristics, heat resistance and miscibility. The photographic characteristics are such that the dye is photographically inert to roentgen emulsions and has no influence upon sensitivity, gamma, fog, etc.

Other compounds wherein the anthraquinone nucleus is substituted with amino groups, alkylamino groups or benzylamino groups cannot be adapted to the present invention because of their low heat resistance, although having a structure similar to that of the dyes used in this invention. Examples of such low heat-resistance compounds, unsuitable for use in the present invention, are 1,5-diamino-4,8-dihydroxyanthraquinone, 1-methylamino-4-(p-methylphenyl) aminoanthraquinone, 1,4-di-benzylaminoanthraquinone, 1- amino-4-phenylamino-anthraquinone, etc.

The amount of coloring material incorporated into the polyethylene terephthalate films of this invention is selected according to the above-mentioned chromaticity and depends upon the thickness of the polyethylene terephthalate film employed. For example, when the thickness of the polyethylene terephthalate film is 175 m.$\mu$, the range of coloring material employed is 0.004% to 0.03% by weight. Alternatively, the amount of coloring material to be added can be calculated by multiplying the base thickness of the film by the color density of the coloring material to be incorporated.

The following examples will more readily illustrate the present invention without limiting the same.

The term "polyethylene terephthalate," in this application, is meant to include not only polymers consisting only of ethylene and terephthalate units, but also polymers containing up to 20% of a third component other than the polyethylene terephthalate, per se.

Such components may be for example, phthalic acid, adipic acid, sebacic acid, azalaic acid, diethylene glycol, polyethylene glycols, such as triethylene glycol, 1,3-propandiol, 1,4-butandiol, neopentyl glycol and the like.

In the foregoing specification, the symbols "X" and "Y" refer to tristimulus values, and the symbols "$x$" and "$y$" represent chromaticity coordinates, as described in "Color Science", page 276, by G. Wyszecki and W.S. Stiles (John Wiley and Sons, Inc. 1967). The term "standard light C" refers to a CIE standard source C; that is, a standard colorimetry illumination source, also described in the above publication at page 31.

EXAMPLE

For a comparison of heat resistance between the dyes of the present invention and those of U.S. Pat. No. 3,488,195 (hereinafter Hunter), the following dyes were tested under the following conditions.

Heat Resistance Test Employed

The heat resistance of Dyes 1–3 was measured with a dyed film prepared by means of an injection machine, since suitable temperatures and holding time could be selected with the use of an injection cylinder. The melt casting temperature of the polyethylene terephthalate was 300°C, while the holding time was 2, 8 and 15 minutes.

Preparation of the Samples

Dyes 1 through 3, each, were dissolved in methylene chloride and mixed with a pellet of polyethylene terephthalate. Each dye adhering to the surface of the polyethylene terephthalate pellet was dried under vacuum to remove any solvent. 0.02% by weight of dyestuff was added to the polyethylene terephthalate in each case (based on weight of molded product of dye plus polyethylene terephthalate).

Injection Molding

The Injection Apparatus employed was an apparatus identified as "Neomat 150/75," manufactured by the Sumitomo Shipbuilding and Machinery Co., Ltd. The temperature of the injection cylinder was 300°C; the holding time was 2 minutes and 8 minutes; and the thickness of the dyed polyethylene terephthalate color plate was 1 mm.

Evaluation of the Heat Resistance of the Dyes Tested

The spectral absorption of the molded color plates at the range of the visible ray was measured by a spectrophotometer [Hitachi EPS3T type (manufactured by Hitachi Ltd.)] at transmission light.

As noted in FIG. 3 accompanying the instant application, as the holding time becomes long, the peak value of the absorption curve becomes low and the background (the lower part of the curve) becomes higher. This indicates that the color purity is diminishing. The value at 440 m.$\mu$ of the absorption curve, which corresponds to a yellow color is noted as the $b$ value, and the peak value at around 500 to 600 m.$\mu$. is noted as the $a$ value. Consequently, the color purity is indicated $b/a$. When the $b/a$ value is large, discoloration through degradation of the dye is large and the heat resistance becomes quite inferior.

The Dyes Employed

Dye 1: 1,5-(bis(ortho-toluidine)-4,8-dihydroxy-anthraquinone

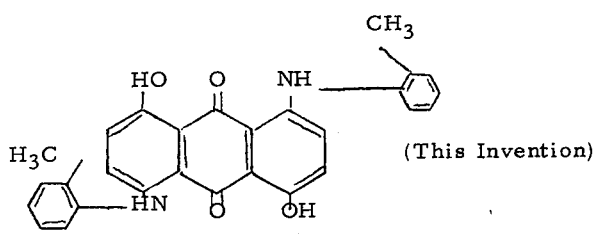

(This Invention)

Dye 2: 1,5-bis(meta-toluidine)4,8-dihydroxy-anthraquinone

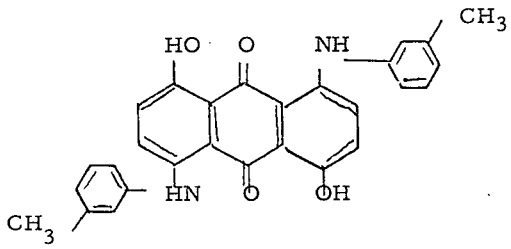

Dye 3: 1,5-bis(para-toluidine)-4,8-dihydroxy-anthraquinone

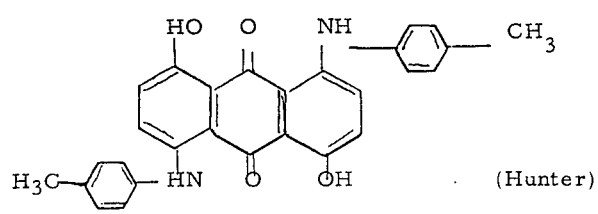

(Hunter)

Evaluation of the Heat Resistance of the Dyes Tested

The heat resistance thus measured is shown in the following Table as well as in FIG. 4 accompanying the present application. It is believed that the slope of the line between 8 and 15 minutes would continue substantially at the same angle at least up to a 30 minute holding time for each sample. In practice, polyethylene terephthalate molding compounds are held for about 10 to 30 minutes at the high molding temperatures employed. Therefore, the data should be compared at the 15 minute designated interval on FIG. 4. Obviously, comparative data for 10 minutes or less holding time does not have any practical worth regarding heat resistance of dye during the longer holding times employed in polyethylene terephthalate molding procedures.

Table

HEAT RESISTANCE OF EACH DYE TESTED

| Dye | Holding Time at 300°C | Optical Density a value | b value | Color Purity (b/a) | Rate of Discoloring* |
|---|---|---|---|---|---|
|  | 2 min. | 1.499 | 0.125 | 0.083 | — |
| Dye 1 | 8 min. | 1.316 | 0.170 | 0.129 | 0.046** |
|  | 15 min. | 1.250 | 0.428 | 0.342 | 0.259*** |
|  | 2 min. | 1.548 | 0.132 | 0.085 | — |
| Dye 2 | 8 min. | 1.400 | 0.187 | 0.134 | 0.049** |
|  | 15 min. | 1.535 | 0.888 | 0.579 | 0.494*** |
|  | 2 min. | 1.312 | 0.138 | 0.105 | — |
| Dye 3 | 8 min. | 1.200 | 0.189 | 0.158 | 0.053** |
|  | 15 min. | 1.274 | 0.856 | 0.672 | 0.567*** |

*: rate of discoloring caused by thermal degradation $$**: \frac{\Delta b/a}{\Delta t} = \frac{b/a \ (8 \ min.) - b/a \ (2 \ min.)}{t \ (8 \ min.) - t \ (2 \ min.)}$$

$$***: \frac{\Delta b/a}{\Delta t} = \frac{b/a \ (15 \ min.) - b/a \ (2 \ min.)}{t \ (15 \ min.) - t \ (2 \ min.)}$$

The color purity of each dye may be represented as follows:

Dye 1 > Dye 2 ≧ Dye 3
(heat resistance is good)    (heat resistance is poor)

From the above data, it is again demonstrated that the dye of the present invention exhibits superior ability in failure to discolor as well as superior heat resistance when compared with the dyes of U.S. Pat. No. 3,488,195 to Hunter.

Normal dyeing is carried out at about 200°C, while mass coloring is carried out at approximately 300°C, which is above the melting point of polyethylene terephthalate. From the results above, it is clear that only those dyes of the present invention can be employed in a mass coloring process.

Although the present invention has been adequately described in the foregoing specification and examples included therein, it is readily apparent that various changes and modifications can be made without departing from the spirit and scope thereof.

What is claimed is:

1. A process for producing a radiographic polyethylene terephthalate film support, which comprises incorporating into said polyethylene terephthalate at a temperature of about 300°C, 1,5-di(o-methylphenylamino)-4,8-dihydroxyanthraquinone as a coloring compound prior to shaping said polyethylene terephthalate film.

2. The process for producing a polyethylene terephthalate film of claim 1, wherein said polyethylene terephthalate film possesses a chromaticity within the region surrounded by straight lines connecting in turn the four points ($x = 0.304, y = 0.319$), ($x - 0.282, y = 0.308$), ($x = 0.289, y = 0.297$) and ($x = 0.308, y = 0.313$) of the chromaticity diagram of FIG. 2.

3. A radiographic film comprising a radiographic emulsion layer on a support consisting of a colored polyethylene terephthalate film prepared by the process of claim 1.

4. A polyethylene terephthalate radiographic film support prepared by the mass coloring method, comprising polyethylene terephthalate having incorporated therein, 1,5-di(o-methylphenylamino)-4,8-dihydroxyanthraquinone as a coloring compound.

5. The support of claim 4, wherein said polyethylene terephthalate film possesses a chromaticity within the region surrounded by straight lines connecting in turn, the four points ($x = 0.304, y - 0.319$), ($x = 0.282, Y = 0.308$), ($x = 0.289, y - 0.297$) and ($x = 0.308, y - 0.313$) of FIG. 2.

6. The radiographic film of claim 3, wherein said polyethylene terephthalate film possesses a chromaticity within the region surrounded by straight lines connecting in turn, the four points ($x = 0.304, y = 0.319$), ($x = 0.282, y = 0.308$), ($x = 0.289, y = 0.297$) and ($x = 0.308, y = 0.313$) of FIG. 2.

7. A process for producing a radiographic polyethylene terephthalate film support which comprises incorporating into said polyethylene terephthalate at a temperature of about 300°C as a color compound 1,5-di(o-methylphenylamino)-4,8-dihydroxyanthraquinone prior to shaping said polyethylene terephthalate film, said polyethylene terephthalate film possessing a chromaticity within the region surrounded by straight lines connecting in turn the four points ($x = 0.304, y = 0.319$), ($x = 0.282, y = 0.308$). ($x = 0.289, y = 0.297$) and ($x = 0.308, y = 0.313$) of FIG. 2.

8. A polyethylene terephthalate radiographic film support prepared by the mass coloring method, comprising polyethylene terephthalate having incorporated therein as a color compound 1,5-di(o-methylphenylamino)-4,8-dihydroxyanthraquinone, said polyethylene terephthalate film possessing a chromaticity within the region surrounded by straight lines connecting in turn, the four points, ($x = 0.304, y = 0.319$), ($x = 0.282, y = 0.308$), ($x = 0.289, y = 0.297$) and ($x = 0.308, y = 0.313$) of FIG. 2.

9. A radiographic film comprising a radiographic emulsion layer on a support prepared by the mass coloring method, consisting of a colored polyethylene terephthalate film, having incorporated therein, 1,5-di(o-methylphenylamino)-4,8-dihydroxyanthraquinone, said polyethylene terephthalate possessing a chromaticity within the region surrounded by straight lines connecting in turn, the four points ($x = 0.304, y = 0.319$), ($x - 0.282, y = 0.308$), ($x = 0.289, y = 0.297$) and ($x = 0.308, y = 0.313$) of FIG. 2.

10. The process of claim 1, wherein said polyethylene terephthalate film further includes as part of its molecular structure, up to 20% of a component selected from the group consisting of phthalic acid, adipic acid, sebacic acid, azelaic acid, diethylene glycol and polyethylene glycol.

11. The radiographic film of claim 3, wherein said polyethylene terephthalate film further includes within its molecular structure, up to 20% of a constituent selected from the group consisting of phthalic acid, adipic acid, sebacic acid, azelaic acid, diethylene glycol and polyethylene glycol.

12. The support of claim 4, wherein said polyethylene terephthalate film further includes within its molecular structure, up to 20% of a constituent selected from the group consisting of phthalic acid, adipic acid, sebacic acid, azelaic acid, diethylene glycol and polyethylene glycol.

* * * * *

UNITED STATES PATENT AND TRADEMARK OFFICE
CERTIFICATE OF CORRECTION

PATENT NO. : 3,948,664
DATED : April 6, 1976
INVENTOR(S) : Hiroshi Okuyama, et al It is certified that error appears in the above-identified patent and that said Letters Patent are hereby corrected as shown below:

IN THE HEADING:

The Claimed Priority Data is incorrect: Should read

--Aug. 21, 1968    Japan............43/59673

Signed and Sealed this

Twenty-seventh Day of July 1976

[SEAL]

Attest:

RUTH C. MASON
*Attesting Officer*

C. MARSHALL DANN
*Commissioner of Patents and Trademarks*